April 24, 1945.　　　G. DAVENPORT　　　2,374,255
CONTROL FOR MACHINE TOOLS
Filed Sept. 12, 1941　　　5 Sheets-Sheet 1
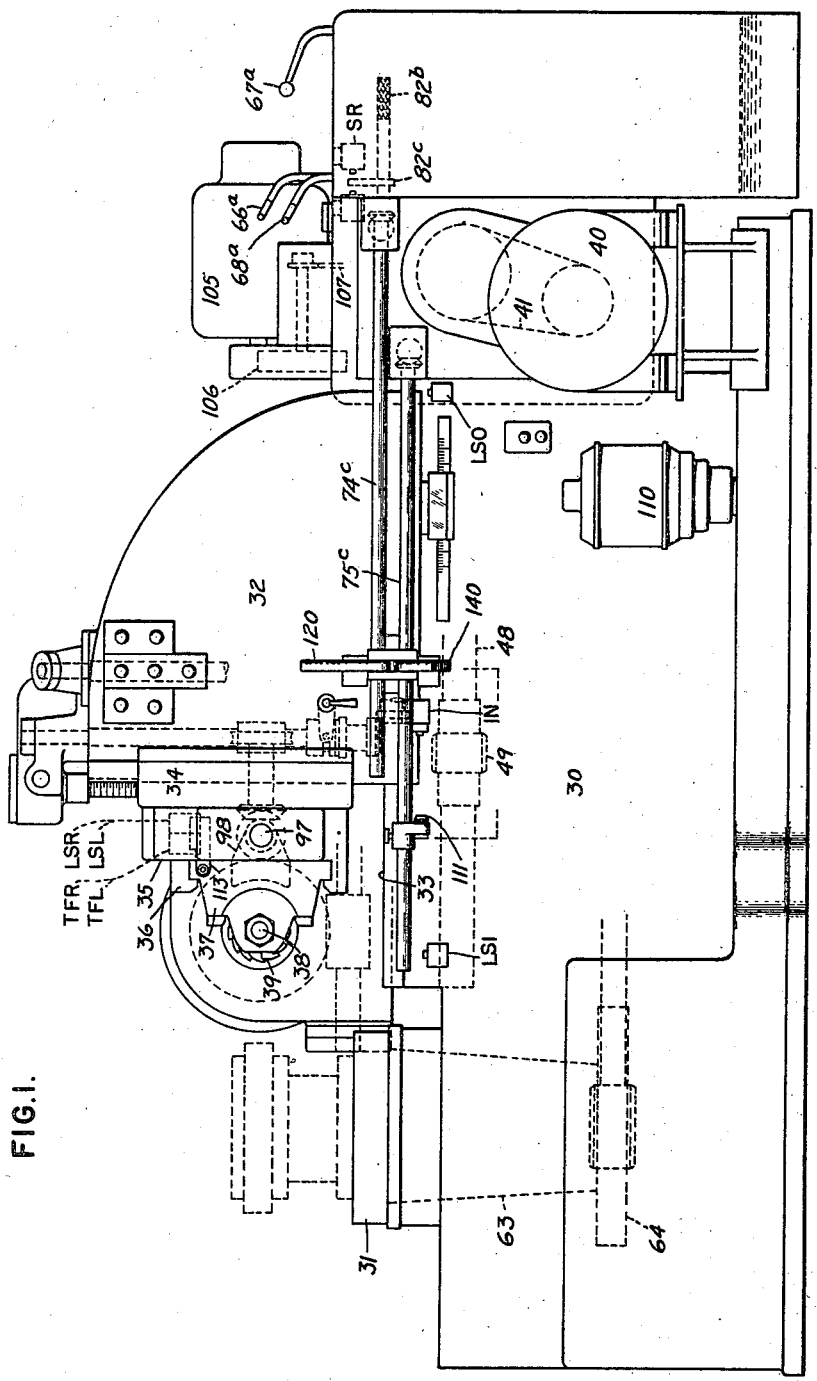
FIG. I.
INVENTOR
Granger Davenport
Albert F. Nathan
ATTORNEY April 24, 1945. G. DAVENPORT 2,374,255
CONTROL FOR MACHINE TOOLS
Filed Sept. 12, 1941 5 Sheets-Sheet 2
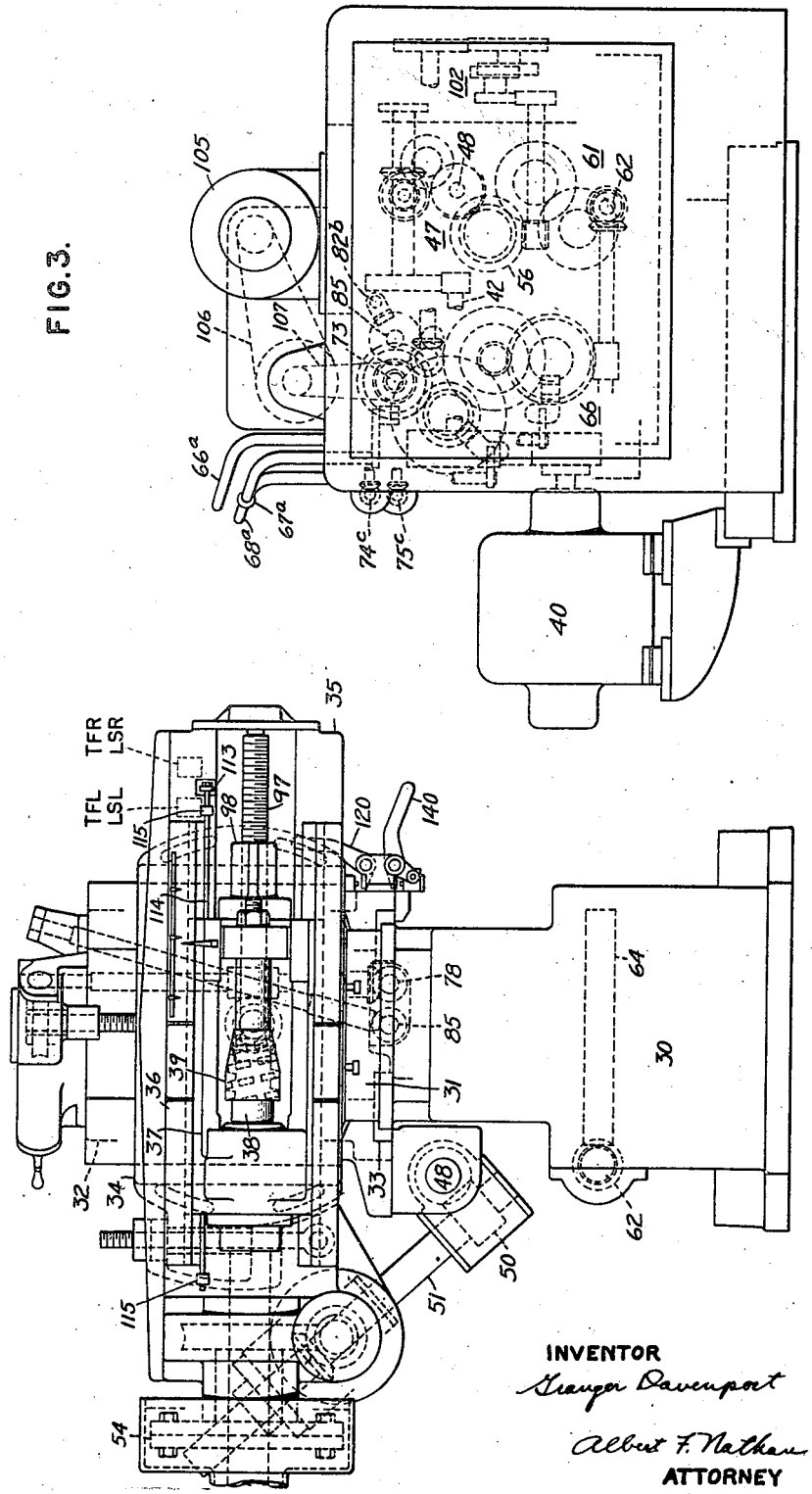
INVENTOR
Granger Davenport
Albert F. Nathan
ATTORNEY April 24, 1945.   G. DAVENPORT   2,374,255
CONTROL FOR MACHINE TOOLS
Filed Sept. 12, 1941   5 Sheets-Sheet 3

INVENTOR
Granger Davenport
Albert F. Nathan
ATTORNEY

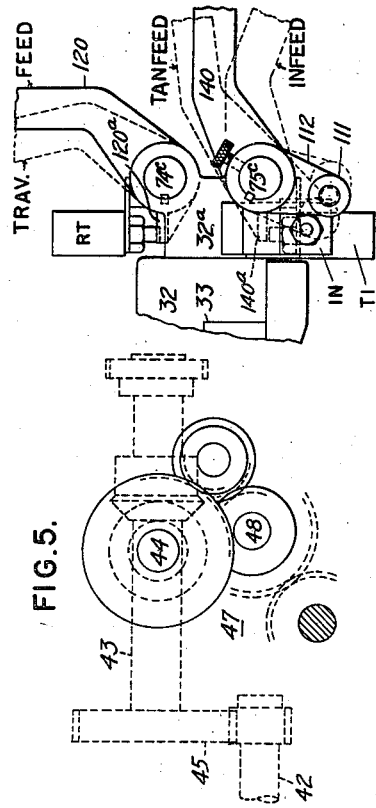

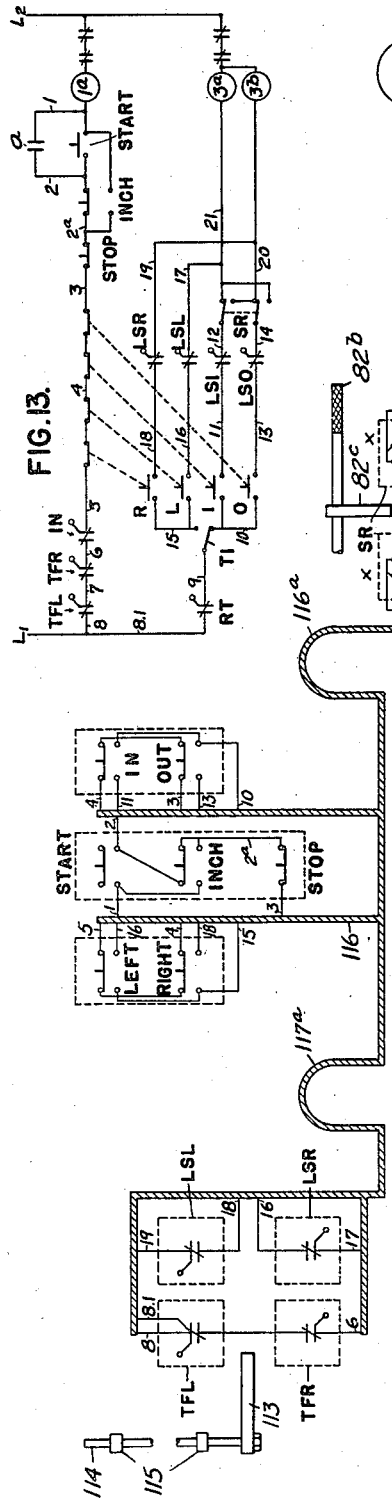

Patented Apr. 24, 1945

2,374,255

UNITED STATES PATENT OFFICE 2,374,255

CONTROL FOR MACHINE TOOLS

Granger Davenport, Montclair, N. J., assignor to Gould & Eberhardt, Incorporated, Irvington, N. J., a corporation of New Jersey Application September 12, 1941, Serial No. 410,491

25 Claims. (Cl. 90—4)

The present invention relates to a species of control and control interlocks for a machine tool in which there are a number of relatively movable elements to be actuated sequentially in transverse directions and at different rates.

A worm gear hobbing machine may be taken as representative of the character to which this invention is suited, for in such a machine the work carrier and hob are power rotated and fed during a normal tooling operation, and the feed may be radially relative to the work axis, or tangentially relative to the work axis, or radially and tangentially, sequentially according to the plan of the gear cutting operation. In such a machine there is also an auxiliary power source, for effecting relative movement between the hob and the work in transverse planes and also in opposite directions in each of the transverse planes, which must not be used concurrently with the main drive, but when used must be directionally controlled in a manner compatible with a previously set condition in the main drive.

While such a machine is basically constructed for manual control and operation, it has been found more expedient to control the machine operations partly automatically, thus avoiding errors in judgment on the part of the operator and at the same time eliminating idle time and non-productive operational moves about the machine.

With the foregoing objectives in view, the present invention aims to render available a semi-automatic control for a machine tool which, in conjunction with certain mechanical elements thereof, is operative to prevent incompatible or inconsistent operation of two or more trains of mechanisms or power sources, correlates directional relations of one or more of the power sources with another or with relation to previously set mechanical elements of the machine, provides for repeated stopping of one or more drive trains at preset distances, guards against accidental abuse of the controls and, in cases where a reversible power source selectively drives a particular element or train which is also reversible, insures that the direction of operation of the power source will be in harmony with the required direction of movement of the driven element in accordance with a preset condition of the machine.

As an aid to an understanding of this invention reference will be made to a worm gear cutting machine of the type disclosed and claimed in the copending application of William F. Zimmermann, Serial No. 410,512, filed of even time herewith. In the machine of that application, a main motor drives the cutter, the work, the main feed transmission, the centifeed and tanfeed sub-transmissions, and the lead gearing, all in harmonious relation. Reversers and clutches are built into the various drive trains at selected points so that reversals of motion may be made in some trains, and directional relations maintained or restored in others, and still others disengaged. In the same machine an auxiliary source of power is provided to effect at least some of the operational movements at a relatively rapid rate for the purpose of expediting the setting up of new work and for expediting machine movements between tooling cycles.

Neither of the two sources of power should be operated while the other is operating, for obvious reasons, and this invention aims to provide a system of controls wherein each power source is controllable independently of the other, but wherein the control of each is interlocked with and mutually dependent upon the other.

The invention further undertakes to provide a double system of controls for a reversible motor which is operable to drive an independently reversible transmission in such manner that when that transmission of the machine has been preset to effect an operation powered by another motor, one of the two systems of controls for the reversible motor becomes effective and the other system becomes ineffective, and conversely. And to embody in at least one of said two systems of control a supplementary relation-restoring-device for oppositely converting the effective action of the control on the reversible motor in accordance with a particular condition in the machine so that when the said one of the two parallel systems of controls is effective, the actual direction of motor operation is in harmony with that particular condition. When that particular condition changes, the motor direction is also automatically changed to again harmonize the relations. For example, in the cutting of worm gears by the infeed method, the direction of feed must always be "in." However, and inasmuch as the feed is taken off the work index train, the reversing of the index train (for opposite hand gear rotations and cutting) also reverses the motion in the infeed train. By placing a motion restoring device in the infeed train, a feed "in" may be had irrespective of the direction of work index. The power rapid traverse train in the instant example, connects to the infeed train ahead of the direction restorer therein and consequently must be actuated in one direction under one condition and in another direction under another condition to effect the same ultimate result, to wit, an "in" movement of the cutter or an "out" movement of the cutter when the associated control is actuated regardless of the hand of the gear being cut.

On the other hand, when the same rapid traverse motor is used to propel the cutter tangentially of the work, its directions of motion must concord therewith at all times for the reason that the direction of operation of the tangential feed train is preordained by the fixed gearing between the feed screw and the traverse motor.

The naturalization of the various controls for a machine of the above character is a further aim of this invention and which has been achieved in the manner disclosed, by the provision of a number of mechanically and hand operated switches that are connected in interlocked circuits arranged safely to insure sequential operation according to a prearranged plan of machine operation. In the instant case, for example, there are two sets of control circuits for the motors, one set controlling the main motor and another set controlling the auxiliary. These control circuits are interlocked with each other so that only one may be effective at any one time. In combination, one of the control circuits, at a point beyond the interlock just mentioned, subdivides into two parallel sets of control circuits for the same motor, but both preceded by a selector which, by its position, determines which one of the two parallel control circuits will be effective, according to whether one train of mechanism is preset for operation or another. And in one of the sets of parallel control circuits there is provided a direction naturalizing device which is automatically operated to rearrange the control circuit in accordance with the previously set position or positions of mechanical elements further along in one of the two selectively driven trains.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which—

Figure 1 is a side view of a machine tool embodying this invention and illustrating the locations of certain of the interlocked controls.

Figs. 2 and 3 are front and rear views respectively of the machine illustrated in Figure 1.

Figs. 5 and 6 are detail views of the speed and index change speed mechanisms respectively.

Fig. 7 is a detail view of the main feed change speed gearing.

Fig. 8 is a detail view of a portion of the tangential feed and infeed transmissions with a direction restoring mechanism in the infeed train interlocked with the control system for the rapid traversing motor.

Figs. 9 and 10 are details of the power take-off for the lead change gearing and of the lead change gears, respectively.

Fig. 11 is an enlarged view of two of the control levers of the machine and their relation to portions of the motor control systems.

Fig. 12 is a schematic diagram of the machine wiring, and Fig. 13 is a simplified line diagram thereof.

Figure 4:
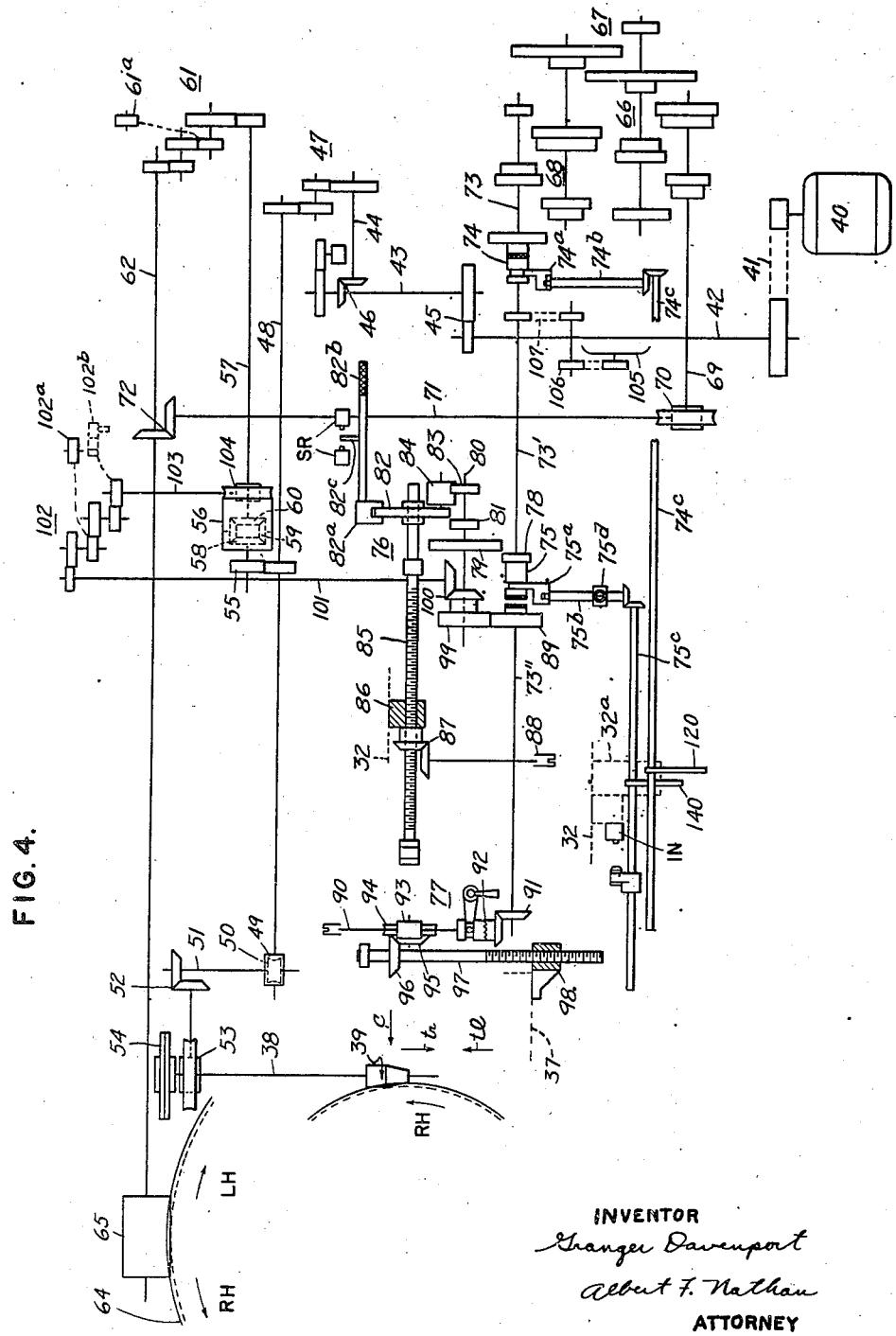
Fig. 4 is a line diagram of the main drive and rapid traverse transmissions and their interlocking controls.

With reference to Figures 1, 2 and 3, the machine illustrated represents a worm gear hobbing machine having a main frame or base member 30 which has journaled therein on a vertical axis, a rotatable work supporting table 31. At one side of the work table, the base also supports a reciprocable tool carrying stanchion 32 mounted on horizontal ways 33. On the side of the stanchion facing the work table there is mounted a vertically adjustable tool slide 34, which in turn carries a head 35 pivoted on an horizontal axis. To the front of the pivoted head 35, horizontal guides 36 translatably support a laterally movable tool slide 37 in which is journaled the cutter spindle 38 that drives the cutter or hob 39.

With the elements just referred to, mounted and related as indicated, the gear cutting hob 39 may be adjusted laterally to the left or right (as viewed in Fig. 2) vertically up or down, in or out with relation to the work table or angularly about a horizontal axis. Certain of these movements and combinations of movements are imparted to the cutter during a gear cutting operation and the means provided for effecting such movements will now be explained.

Referring more particularly to Figs. 1 to 4, the main source of power is provided by a motor 40, and enters the machine through a multiple V belt drive connection 41 to drive a main drive shaft 42. The shaft 42 transmits power to a shaft 43 thence to shaft 44 through gears 45 and 46, respectively. The shaft 44 drives through speed change gearing indicated generally as 47 (Fig. 5) to a cutter drive shaft 48 that extends along the side of the machine toward the work table. The forward end of the shaft 48 is splined and has slidingly mounted thereon a worm 49 that meshes with a worm gear 50 secured to a tiltable shaft 51. The upper end of the shaft 51 is splined and mounts thereon one of a pair of bevel gears 52 which transmits the power to a worm and worm wheel mechanism 53 and thence to the spindle 38 and hob 39 through index plates 54. Through the train of mechanism just described the hob 39 is power rotated in one direction at the rate of speed determined by the pick-off gears 47.

The work table rotating train, or index train as it is commonly called, takes power from the cutter drive shaft 48 through gears 55, one of which connects with a differential mechanism 56 mounted coaxially with shaft 57. Assuming the casing of the differential to be stationary, the gearing 55 drives the bevel gear 58 in the differential housing, and through spider gears 59, reversely drives gear 60 on the shaft 57. The shaft 57 transmits power through index change speed gearing 61 (Fig. 6) to the work table drive shaft 62 that extends along the side of the machine to the work table 31. The work table is mounted in tapered bearings 63 and has secured to its lower end a worm wheel 64 which is continuously engaged by a driving worm 65 mounted on the drive shaft 62.

The index change speed gearing 61 consists of a plurality of changeable pick-off gears operative to rotate the work table in timed relation with hob rotations and at a rate compatible with the lead and speed of the hob. As illustrated in Fig. 4 the change speed gearing 61 is arranged to drive the work blank in a direction compatible with the cutting of a right hand worm gear, but should it be desired to rotate the work blank in the reverse direction, as for cutting a left hand worm gear, an intermediate gear 61ª is inserted in the index gearing 61 to obtain a reversal of the motion. The adding or removing of the intermediate gear 61ª does not, however, effect the direction of cutter rotation which is "top coming" with relation to the work at all times.

The power for feeding the hob 39 radially inwardly into the work blank or tangentially along its circumference, is taken off the table index drive shaft 62, thus obtaining a rate of feed in direct relation to the rotations of the blank. That is, the cutter feed of the present machine is based upon the revolution of the blank and the relation does not change during the cutting of the gear or merely because the size of the gear to be cut may be changed.

The main feed works comprises three serially arranged built-in speed change mechanisms indicated generally as 66, 67, and 68 (Fig. 7) which receive power initially through shaft 69, worm and worm wheel 70, from a shaft 71 that is connected into the index shaft 62 by bevel gearing 72. The first set of feed change gears 66 provide four speeds; the second set 67 provide two; and the third set 68 provide four; and as all are in series, a total of thirty-two different feed rates may be imparted to the main feed shaft 73.

The direction of feed motion in the shaft 73 depends, however, on the direction of motion in the index shaft 62 which may be changed as above explained by the insertion or removal of the intermediate gear 61ª in the index change speed gearing.

Coaxially arranged with the shaft 73 is a second shaft 73' for receiving the feed power through a manually shiftable clutch 74. When the clutch 74 is in the closed position illustrated in Fig. 4, the feed power is transmitted to the shaft 73' to a dual clutch 75, which, when shifted manually to the right or to the left from the neutral position shown in Fig. 4, directs the power selectively to a cutter infeed transmission 76 or the cutter tangential feed transmission 77.

The cutter infeed transmission includes gears 78 and 79, shaft 80 and gears 81, 82, or gears 83, and 84 and 82 related and arranged to rotate the stanchion feed screw shaft 85. The gear 82 is slidingly mounted upon the shaft 85 and when shifted to the left (in Fig. 4) meshes with the gear 81 and drives the screw shaft in one direction, or when shifted to the right into mesh with gear 84, drives the screw shaft in the opposite direction. This mechanism is in reality a direction restoring device and is utilized to maintain the direction of power infeed of the cutter radially inwardly of the work blank irrespective of the direction of operation of the main feed works which in turn is dependent upon the direction of work rotation or hand of gear to be cut as previously explained.

The stanchion feed screw shaft 85 is rotatably but non-translatably journaled in the main frame 30 of the machine and is engaged by a traveling nut 86 secured to the underside of the stanchion 32. Splined to the screw shaft 85 is a bevel gear 87 arranged to be operated through a manually operable shaft 88 for effecting hand rotations of the screw shaft 85 and consequent in or out movements of the cutter stanchion when desired.

When the dual clutch element 75 is shifted to the left (in Fig. 4) the radial feed transmission 76 is disengaged and the tangential feed transmission 77 is engaged. The latter train comprises a clutch gear 89 secured to the shaft 73" coaxially related with the shaft 73'. The shaft 73" extends forward and transmits power to a vertical worm shaft 90 through bevel gears 91 and a normally closed recutting clutch 92. On the shaft 90, a worm gear 93 is splined which meshes with a worm wheel 94 mounted in the vertically adjustable slide 34 at the tilting axis of the head 35. The worm wheel 94 drives bevel gears 95 and 96, the latter of which is secured to a horizontally extending screw shaft 97 journaled in the tiltable head 35. The screw shaft 97 is engaged by a traveling nut 98 which is secured to the tangential cutter slide 37. Thus, when the dual clutch 75 is shifted from its neutral position to the left, power feed is directed to the tangential slide 37 and propels the hob 39 to the right or to the left depending upon the hand of the gear to be cut.

It may be mentioned here that the gearing for the tangential feed of the hob of the present machine is initially constructed to impart a feed movement to the cutter or hob in a direction always opposed to the direction of roll of the work, that is, the tangential feed is always against the work rotation so that the advance of the cutter holds back rather than pulls the work along. As illustrated in Fig. 4, the above mentioned relation of tangential feed to work rotation, remains a fixed relation notwithstanding the fact that the machine may be set up for cutting either hand of worm gears. In other words, if the machine is set up for cutting right hand worm gears, work rotation movement is counterclockwise (Fig. 4), and the tangential feed of the hob is in the direction of the arrow $tr$. If the machine is initially set up for cutting left hand worm gears, rotational movements of the work blank is clockwise and the direction of tangential feed of the cutter is in the direction of the arrow $tl$.

During tangential feeding the harmonious relation between the hob and the blank must be maintained and compensation must therefore be made for the relative lateral shift between the hob and the work. In the present machine the differential in the relative motions is brought about by imparting a slow rotational movement to the casing of the differential mechanism 56. Power for effecting the differential action is taken solely from the tangential feed transmission 77 through clutch gear 89, gears 99, 100, and lead shaft 101 (Fig. 9) which delivers the power to lead change gearing indicated as 102 (Fig. 10). The lead gearing 102 comprises a plurality of changeable pick-off gears, and power at the selected rate is delivered to a worm shaft 103 and to the worm and worm wheel 104 associated with the differential 56. Thus, whenever the tangential feed train is in operation the lead compensating train is also operating and compensation is made for the lateral shifting of the hob. Through the differential mechanism 56, compensation is apportioned between the work index, cutter drive, and tangential feed transmissions, and one, two or all of the drives may be compensatingly effected.

Provision is also made in the lead gearing 102 for the insertion or removal of an intermediate gear 102ª so that the change in the direction of the tangential feed, due to the insertion or removal of the intermediate gear 61ª in the index train, will not inversely affect the operation of the differential mechanism. As illustrated in Fig. 4, the differential mechanism 56 is in the work table drive train at a point ahead of the index gearing 61 and changes in the direction of work index are effected after power leaves shaft 57, and the direction of motion in shaft 57 does not change. When tanfeeding the hob the rate of motion in shaft 57, however, should be relatively retarded when the set-up is for right hand gear cutting and also retarded when the set-up is for left hand gear cutting and to effect such relative retardation in both instances the intermediate gear 102a is inserted or removed from the lead gearing 102 to obtain differential action in the proper direction with relation to the direction of work rotation. The intermediate gear 102a is in effect a relation restoring device in the lead compensating transmission and it is convenient to locate it in the lead change gearing whereat the appropriate change may be made at the time the machine lead gears are installed for the particular work at hand. For simplifying the initial set-up of the machine, the intermediate gear is used in the lead change gearing whenever the intermediate gear is used in the index gearing.

When the machine is set up for cutting worm gears by the infeed method only, the differential mechanism is out of action and locked. A lead locking plate 102a (in dotted outline in Figs. 4 and 10) is placed on the worm shaft 103 in place of the change gear for locking the shaft against rotation in either direction.

The shifting of the various gears and clutches herein above mentioned is effected by manually operable levers, each of which is arranged to perform a single function or a plurality of functions in a definite sequence. For example, each of the serially arranged feed change mechanisms 66, 67, 68 are selectively shifted by means of levers 66a, 67a and 68a.

The main feed clutch 74 is shiftable from its engaged to its disengaged position by a shifter 74a operated from a rod 74b that is geared to the shaft 74c extending along the side of the machine and on which is splined a feed and traverse control lever 120. The control shaft 74c extends through a bracket 32a mounted to the side of the stanchion and the lever 120 is splined to the shaft and moves with the bracket.

The dual clutch 75 is similarly shifted to one of its three positions by shifter 75a that is actuated by the rod 75b. The latter is geared to a control shaft 75c that also extends along the side of the machine and through the bracket 32a. An infeed and tangential feed control lever 140 is splined to the control shaft 75c and is operable to shift the clutch 75 from neutral to either of its effective positions. Spring detent means indicated at 75d is provided to assist in holding the clutch in set position.

The foregoing trains of mechanisms constitute the main drives to the hob and work blank that are utilized during a normal gear cutting operation. In setting up the machine for different sizes of gears, and between operations upon a given gear and of gears of the same class it is, however, more convenient and efficient to effect certain of the repositioning movements between hob and the work at a rapid rate and for that purpose a rapid traverse motor 105 is provided. The rapid traverse motor is of the reversible type and is connected to drive the intermediate shaft 73' through a belt and chain connection 106 and 107. When the main feed clutch 74 is disengaged from the feed shaft 73, the traverse motor 105 may be operated to propel the cutter radially of the work or tangentially thereof in either direction at a relatively rapid rate, through either the centifeed transmission 76 or the tanfeed transmission 77, as previously explained. To avoid conflict by attempting simultaneous operation of the traverse motor and the main feed motor 40, the motor controls are mechanically and electrically interlocked, as will hereinafter be explained, and incompatible operations definitely prevented. In addition to interlocking of the traverse motor with the main drive motor, the traverse motor is also interlocked with the direction relation restoring mechanism 80—84 in the centifeed transmission 77 so that its direction will automatically be harmonized with the previous set position of the relation restoring device. This interlock automatically prevents confusion in the operation of the controls for in and out cutter traverse movements, when the machine is set up for either hand of gear to be cut. For example, when setting up the machine for cutting right hand gears, the sliding gear 82 will be moved in (toward the left in Fig. 4) and meshed directly with the gear 81, the shifting being effected by a shoe 82a which is actuated by a handle 82b. With the gear in said last mentioned position, rotation of the said shaft 73' in the normal direction for right hand gear cutting, will effect a relatively slow power infeed movement to the cutter. The direction of motion of the rapid traverse motor 105, when the latter is used for traversing the cutter in or out under this condition must, therefore, be consistent with the positioning of the sliding gear 82. On the other hand when the machine is set up for left hand gear cutting, the intermediate gear 61a is inserted in the index train (which reverses the direction of table movement and also the direction of the main feed works) and the proper direction of power infeed under this condition, is obtained by moving the sliding gear 82 to the right (in Fig. 4) and in mesh with the intermediate gear 84. When so positioned, the gearing 83 and 84 restores in shaft 85, directional rotations compatible for infeeding for left hand gear cutting. Under this last mentioned condition, the direction of operation of the traverse motor 105 must be opposite to that required for right hand gear cutting. So that one set of controls may be provided for effecting in or out traverse movements of the cutter when the machine is used for either right or left hand gear cutting jobs, the present invention coordinates the direction of motor operation with the positioning of the gear 82.

The coordinating of the direction of motor operation with the hand of the gear to be cut is, with the present invention, effected automatically, but this automatic coordinating of motor movement applies only to the radial movements of the cutter and not to the tangential movements of the cutter. When the traverse motor is used to propel the cutter tangentially to the left or to the right (as viewed in Fig. 2) its direction of operation must then be such as consistently to traverse the cutter slide to the right or to the left when the respective controls are actuated, irrespective of the direction of work rotation or of the direction of tanfeeding. In the instant organization, therefore, one motor is utilized selectively to drive two transmissions; as to the one transmission the motor must automatically adapt itself to a changeable condition therein, but as to the other transmission, the motor operations must be consistent throughout; and as to both transmissions the motor must be capable of being reversed without upsetting previously set relations.

The manner in which the several trains of mechanisms and motors are automatically harmoniously related and interlocked will be explained with reference more particularly to Figs. 1, 2, 4, 11, 12, and 13, the latter two figures illustrating the schematic and simplified wiring diagrams, respectively.

Referring to Fig. 12, the box MS represents a magnetic starter for the main drive motor 40, and the box RMS represents a reversing magnetic starter for the rapid traverse motor 105. Each of the starters is of standard commercial construction and need not be explained in detail except to state that the motor control main switches a, b, and c thereof, are controlled and operated by electric solenoids 1a, 3a and 3b. Normally, the motor switches are open and no current passes to the respective motors. When, however, one or more of the solenoids 1a, 3a, 3b is energized the associated main switch is closed and the motor operation starts.

Each of the solenoids is controlled by a secondary circuit connected across power lines L1 and L2 as illustrated diagrammatically in Fig. 13. Assuming all of the serially arranged switches in the control circuit for solenoid 1a are closed, as shown in the diagram, the pressing of the Start button will energize the solenoid 1a, close the main switch a, and start the motor 40 operating. Connected in parallel with the motor 40 is a coolant motor 110 which may be operated whenever the main motor is operating, provided also its own starting switch SW is thrown to close the circuit.

When the Start button for the main motor is pressed a holding circuit, marked 2 on the diagram, is completed around the start button and the latter may be released. In series ahead of the starting switch is an Inch switch and a Stop switch, both normally closed. A pressing of the Inch switch will, if the main motor has been started, first deenergize the coil 1a and open the holding circuit thereby stopping the motor, and continued pressing of the Inch switch will close a circuit across lines 1 and 2a thereby energizing coil 1a of the starting panel MS and restart the motor. The starting of the motor by the Inch button does not, however, complete any holding circuit across the coil 1a and the main motor operates so long as the Inch button is pressed. Ahead of the Inch switch, the Stop switch is placed, and which, when pressed, will open any circuit that may have been completed to coil 1a and thereupon effect stopping of the main motor.

In series ahead of the Stop switch are four additional normally closed switches, which will later be referred to, and ahead of those, are three normally closed micro switches, In, TFR, and TFL which are utilized to stop the infeed movement of the cutter at a precise point; the tangential feed right of the cutter, and the tangential feed left of the cutter at manually settable points.

The micro switch In is carried by the stanchion and is adapted to be actuated by an adjustable precision abutment 111 mounted upon the dual clutch control rod 75c. The abutment 111 is carried by a short lever 112 that maintains a fixed angular relation with respect to the shaft 75c so that a rocking of the shaft 75c for the purpose of actuating the dual clutch 75, will also position the abutment 111 in or out of operative relation with respect to the operating button of the switch In. Fig. 11 illustrates in full lines the relative positions of the parts when the dual clutch is in neutral. When, however, the lever 140 is moved to its extreme downward position, the dual clutch 75 is shifted to the right, in Fig. 4, and power infeeding of the stanchion will occur. Concurrently, the abutment 111 is rocked into the path of movement of the switch In, and when the stanchion has been power fed to the point where the abutment is engaged by the switch In, the control circuit for the main motor is opened, whereupon the motor stops and power infeed stops.

Should the tangential feed train be in operation, the limit switches TFR and TFL are arranged and preset to open the circuit to the main motor when the cutter reaches the set limit of travel either to the right or to the left. The micro switches TFR and TFL are mounted in the pivotal head 35 of the machine one at either side of a short actuating lever 113. Lever 113 projects through the front face of the head and has secured thereto a horizontally extending rod 114 that passes through and some distance beyond each end of the cross slide 37. At each side of the slide 37 adjustable dogs 115 are mounted upon the rod, each of which may be hand set to be engaged by the cross slide 37 when the latter has been power fed tangentially the required distance. When the cutter slide has reached one of the abutments 115 continued movement thereof actuates the rod 114 and its associated lever 113 and opens one of the switches TFR or TFL depending upon whether the direction of power feed is to the right or to the left, respectively. The operator, having previously set the actuating dogs in their proper positions to stop the cutter feed "in" or to stop the cutter feed to the right or to the left at the proper points, may then press the Start button for the main motor and the machine will start operating and perform the tooling cycle and stop automatically at the end thereof. Or he may Inch the cutter to cutting position and then start the normal operation. At any time during the operating cycle he may stop the machine by pressing the Stop button.

Interlocked with the control for the main motor 40 is the control for the auxiliary rapid traverse motor 105. The interlocking of these controls takes the form of a normally closed switch RT which is mechanically connected for operation by the main feed control lever 120. When the feed control lever 120 is in its power feed position (full line position illustrated in Fig. 11) the power feed clutch 74 is shifted to the right (Fig. 4) and a short extension 120a on the control lever 120 engages and depresses the button of the switch RT and opens the entire control circuits for the forward and reverse coils of the reversing starter RMS. Accordingly, when the main power feed clutch is engaged, the rapid traverse motor is inoperative, and it is only when the power feed clutch is disengaged (lever 120 in dotted line position in Fig. 11) that the switch RT is closed thereby making it possible to operate the rapid traverse motor, provided other conditions are met.

As illustrated in Figs. 12 and 13, two sets of parallel circuits are provided for controlling the operation of coils 3a and 3b of the reversing panel RMS. One set is arranged to control direction of motor operation when used for the purpose of effecting power traverse of the cutter to the right or to the left, and the other set, controls motor operation when used for effecting power traverse of the cutter in or out. Each of these four control circuits includes a normally open push button switch marked Right, Left, In and Out, respectively, and to avoid confusion in their manipulation the four circuits are arranged in pairs and each pair connected to opposite sides of a double throw switch marked TI. Switch TI is in series with the rapid traverse switch RT and is also mechanically connected with the dual clutch control lever 140. When the dual control lever 140 is rocked downward, to thereby engage the clutch 75 with the infeed transmission 79, etc., the switch TI closes one pair of its contacts and completes an electrical connection to the pair of traverse motor control circuits including the In and Out push buttons, and the pair of circuits including the right and left push buttons is rendered ineffective. When, however, the control lever 140 is shifted to its uppermost position, to engage the tanfeed transmissions 77 with the feed shaft 73', the switch TI is actuated by an extension 140ª on the lever to a position closing its other pair of contacts and completes a portion of the circuit including the Right and Left push buttons, and the pair of circuits that include the in and out buttons become ineffective.

In series with each of the manual switches Right, Left, In and Out for the traverse motor, is a normally closed limit switch LSR, LSL, LSI, LSO, respectively. The limit switches LSR and LSL are located in the swivel head 35 of the machine adjacent the micro switches previously explained and are adapted to be actuated by the same lever 113 concurrently with the micro switches TFL and TFR. Two sets of switches in this particular location are necessary as each set controls a different motor and each motor must be stopped when the tool slide has been propelled to the right or to the left the set distance.

The limit switches LSI and LSO are mounted upon the base of the machine in the positions to be actuated by dogs carried by the movable stanchion 32 when the stanchion has reached the limit of its travel in or out.

At this point it is important to note a difference between the controls for the stopping of the motor when feeding the cutter to the left or to the right and the control for stopping the motor when traversing the cutter to the left or to the right. In the control for the main feed motor, the micro limit switches are in series which automatically prevents inadvertent back feeding of the cutter through the finished work, whereas, the tangential limit switches for the traverse motor are in parallel, so that the cutter can be traversed back and forth by the one motor as often as desired. Ordinarily, however, the cutter slide is traversed to the right or to the left prior to any actual tooling operation performed by the cutter on the work and traversing of the cutter back and forth when it is out of engagement or out of contact with the work will not, of course, injure the workpiece.

It has been explained above that when the rapid traverse motor 105 is used for traversing the cutter stanchion "in" or "out" the direction of operation of the motor must concord with the previously set position of the sliding gear 82 in the infeed sub-transmission, and the position of the gear 82 depends upon whether the machine is set up for cutting left or right hand gears. Two sets of controls for the traverse motor could be provided, one set to be operated when the machine is set up for right hand gear cutting and the other set to be operated when the machine is set up for left hand gear cutting, the two sets being connected to effect converse directions of rotation of the motor. Such a duplication of controls would, however, cause confusion in the operating of the machine and necessitate a complicated system of mechanical or electrical interlocks. The present invention aims to simplify the control in a manner whereby one set of push buttons marked In and Out may be used to effect stanchion traverse in the direction indicated by the legends on the buttons, when the machine is set up for cutting either right or left handed gears. To achieve that end a pair of mechanically connected reversing switches SR are connected in the In and Out control circuit of the motor 105 between the coils 3ª and 3ᵇ and the limit switches LSI and LSO. When the converting switch SR is in the position indicated in Fig. 13, a pressing of the In button will energize the forward coil 3ª of the reversing panel and the motor will run in a forward direction, whereas, a pressing of the Out button will energize the reverse coil 3ᵇ and the motor will run in the opposite direction. However, when the switch SR is shifted to its other position, the In button controls the reversing coil 3ᵇ and the Out button controls the forwarding coil 3ª.

The switch SR is located in the machine in a position to be operated automatically when the sliding gear 82 is shifted from one effective position to another. As shown on Figs. 1 and 4, a short lever 82ᶜ projects laterally from the gear shifting rod 82ᵇ to a position intermediate the opposed buttons of the reversing switches SR. When the rod 82ᵇ is shifted to restore a previously existing directional motion in the feed shaft 85, the switch SR is also actuated to close the switches on one side and complete portions of the controlling circuit to the coils 3ª and 3ᵇ, and when the control rod is shifted to its other extreme position the switches are also closed on the other side and thereby complete portion of the circuit to the coils 3ª and 3ᵇ but in the reverse manner. By interlocking and relating directional rotations of the traverse motor with the position of the sliding gear 82 in the infeed transmission, one set of control buttons may be employed with the assurance that the direction of cutter traverse will be consistent with the legend on the button actuated when the machine is set up for either right or left hand gear cutting. It will be further observed on inspection of Fig. 13, that the reversing switch SR is inserted in the control circuit for the In and Out motions of the stanchion, and its function is confined solely to that branch of the control. Such a device for reversing directional relations is not required in the control circuit for the right and left traverse motions for the reason that directions of movement are predetermined by the fixed gearing between the rapid traverse motor 105 and the tangential feed screw 97.

When the traverse motor 105 is being operated to propel the cutter "in" or "out" or to the "right" or to the "left," the main motor 40 must not, of course, be allowed to operate because a starting of the main motor 40 would cause work and cutter rotations to occur thus bringing about a dangerous condition. Moreover, and dependent upon whether the rapid traverse motor 105 is being used at the time for traversing the cutter to the left or to the right, and in that event also driving the differential mechanism 56 through the branch drive 101, the starting of the main motor 40 would also drive the differential and bring about a chaotic condition. Therefore, to guard against an inadvertent operation of the main motor while using the traversing motor, each of the push button switches, Right, Left, In and Out (marked R, L, I, and O in Fig. 13) are double pole double throw switches. Each of the switches has one set of contacts normally closed and connected in series with each of the others and forms part of the control circuit for the main motor. Fig. 13 illustrates diagrammatically the series connection of the traverse motor control switches with the control circuit of the coil 1ª of the main starting panel MS for the main motor. The dotted lines in Fig. 13 represent the mechanical connection between the respective push buttons (R, L, I, O), and their respective series connected switches they operate. When, for example, the Right button is pressed to traverse the cutter to the right, an interconnected switch in the control circuit of the main motor is opened. Accordingly, if the main motor is running at the time, a pressing of the Right button of the traverse motor at once stops the main drive. On the other hand if the Right button is being actuated and the traverse motor is operating, the control circuit for the main motor cannot be completed and the motor cannot be started. The same interlocking relation between the control circuit of the main motor and the control circuits for the reversing motor is provided with respect to all of the control buttons Right, Left, In or Out and, in respect to the main motor 40, all of the control buttons for the traversing motor 105 are stop switches.

Fig. 12 of the drawings illustrates schematically one method of wiring the machine wherein the various connections leading to and from the several switches and control panels are brought into a cable 116. Inasmuch as all of the control buttons for both motors are located upon the movable cutter stanchion 32, as illustrated in Fig. 1, the cable 116 is provided with a flexible portion 116ª between the stanchion mounted elements and the base mounted elements to provide for the moving of the stanchion. A similar flexible portion 117ª is provided in the cable 116 between the stanchion mounted elements and the switches in the relatively movable head 35. Thus the head and the stanchion may move relatively to each other and to the stationary base of the machine and the electrical connections remain intact. The numerals 1 to 21 in Fig. 12 indicate similar connecting lines of the control circuits that lead in or out of the cable 116 and correspond in numbering to the system used in Fig. 13 for the purpose of clarifying the circuits and their interconnections.

As herein used the term "centifeed" means a feed movement whereby the hob axis and worm wheel axis are brought closer together, i. e., in a direction radially of the worm wheel blank. The term "tanfeed" means a feed movement whereby the worm wheel and the hob move relatively to one another in a tangential direction, i. e., in the general plane of the worm wheel blank but tangent to its circle.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A machine tool combining a rotatable work carrier and a rotatable and shiftable tool carrier, a main motor for rotating the carriers, an auxiliary motor for shifting the tool carrier, controllers for each of said motors, and a control circuit for each controller including a double pole double throw switch having one of its pairs of contacts serially connected in the control circuit of its associated controller and the other pair of its contacts serially connected in the control circuit for the other controller and operative when actuated from one effective position to another to render one controller circuit effective and the other controller circuit ineffective.

2. A machine tool combining a rotatable work carrier and a rotatable and shiftable tool carrier, a main motor for rotating and shifting the carriers, a clutch between the motor and the shiftable carrier for interrupting the power shifting movement normally effected by said main motor; an auxiliary motor for shifting the tool carrier, separate control means for each of said motors including in the control means for one of the motors a double pole double throw switch having one of its pairs of contacts serially connected in the control means of its associated motor and its other pair of contacts serially connected in the control means for the other of said motors and operative when actuated from one effective position to another to render one control means effective and the other control means ineffective; and an additional normally closed switch in the control means for one of the motors operatively connected with said clutch means for rendering the control means for its associated motor ineffective when said clutch is shifted to a position whereby said main motor is effective to shift the carrier.

3. A machine tool combining a rotatable work carrier and a rotatable and shiftable tool carrier, a main motor and transmission mechanisms for rotating the carriers and a transmission for shifting one of the carriers; clutch means for selectively connecting and disconnecting said shifting transmission from said main motor, an auxiliary motor for shifting the tool carrier, control means for each of said motors including a cutout switch electrically connected in the control means for one of said motors and mechanically connected with said clutch means, said connections being constructed and arranged to render either motor ineffective as a carrier shifting means when the other motor is functioning as such.

4. In a machine tool having an element to be shifted selectively in opposite directions, the combination of a first power means for shifting said element; a second power means for shifting said element; control means for each of said power means including manually operable means for starting each power means in operation selectively, and means for stopping each of the power means when the element has been shifted thereby a preselected distance; and means actuated by said element when shifted by one of said power means to said preselected point to render that particular power means ineffective until said element has been shifted by the other of said power means.

5. In a machine tool having an element to be shifted selectively in opposite directions, the combination of a first power means including a clutch mechanism for shifting said element, a second power means for shifting said element, control means for each of said power means including manually operable means for starting each power means in operation selectively; means for stopping each of the power means when the element has been shifted thereby a preselected distance, including means actuated by said element when shifted by one of said power means to said preselected point to render that particular power means ineffective until said element has been shifted in the opposite direction by the other of said power means; and means interlocked with said clutch and with one of said power starting means for rendering one of the power means ineffective to shift the said element concurrently with the other power means.

6. A machine tool of the character set forth combining a main drive motor and an auxiliary reversible drive motor; an element to be propelled by said motors; a power transmission connected between said element and each of said motors arranged to propel the element normally in a given direction, mechanical direction changing means in the said connecting transmission to one of said motors operative to reverse the direction of movement of the propelled element when the latter is propelled by the said motor, control means for each of said motors, and means interlocking the control for said auxiliary reversible motor with said mechanical reversing means for rationalizing the direction of operation of said reversible motor with the positioning of said mechanical reverser whereby movement may be imparted to said element by said reversible motor in a direction consistent with the direction of movement imparted by said first motor through said mechanical reverser irrespective of the positioning of said reverser.

7. A machine tool combining a member to be shifted, a first power means for shifting the member, a second power means for shifting said member, said second power means being reversible, manually operable control devices for each of said power means, a direct driving transmission between both of said power means and said member for propelling same, and a second transmission between both of said power means and said member including a mechanical reverser for propelling the member in a direction determined by the positioning of said mechanical reverser, means for actuating said reverser to effect a flow of power therethrough in a given direction; means interlocking the control devices for each of said power means with each other to prevent concurrent operation of said two power means; said control devices for the reversible power means including two parallel arranged sets of controls; clutch means common to said two transmissions adapted when actuated to an effective position to connect one of said transmissions with the power means selected to operate to shift the said member; means interlocked with and actuated by said clutch means for selecting and rendering but one of said two sets of controls for the reversible power means effective when a selected one of said two transmissions is connected thereto by said clutch, and means in one of said last mentioned two sets of controls mechanically interlocked with and actuated by said mechanical reverser for coordinating directional motion of said reversible power means with the positioning of said mechanical reverser when the other of said two transmissions is operative.

8. A machine tool combining a member to be shifted, a power means for shifting the member, said power means being reversible, manually operable control means for said power means, a direct driving transmission between said power means and said member for propelling same, and a second transmission between said power means and said member including a mechanical reverser for propelling the member in a direction determined by the positioning of said mechanical reverser, said control means for the reversible power means including two parallel arranged sets of controls; clutch means common to said two transmissions adapted when actuated to an effective position to connect one of said transmissions with said power means and to disconnect the other; means interlocked with and actuated by said clutch means for selecting and rendering but one of said two sets of control for the reversible power means effective when a selected one of said two transmissions is rendered operative by said clutch, and means in one of said last mentioned two sets of controls mechanically interlocked with and actuated by said mechanical reverser for coordinating directional motion of said reversible power means with the positioning of said mechanical reverser when the transmission including that mechanical reverser is rendered operative by said clutch.

9. A machine tool combining an element to be driven, a main motor for driving said element, a transmission between said motor and said element including two serially arranged motion reversers, an auxiliary reversible motor for driving said element having power transmitting connections with said first named transmission at a point situate between said serially arranged reversers and effective to drive said element through but one of said reversers, control means for said main motor, and separate control means for said reversible motor interlocked with and arranged to be actuated by said one mechanical reverser for harmonizing directional rotations of the drive from the reversible motor through said one reverser with the direction of drive effected through both of said reversers by said main motor.

10. The combination set forth in claim 9 including means interlocking the controls for both of said motors for rendering one of said motors ineffective when the other is functioning as the driver.

11. A machine tool combining an element to be driven, a main motor for driving said element, a transmission between said motor and said element including two serially arranged motion reversers, an auxiliary reversible motor for driving said element having power transmitting connections with said first named transmission at a point situate between said serially arranged reversers and operative to drive said element through one of said reversers, control means for each of said motors, clutch means in said transmission between said point of connection of the power from said reversible motor therewith and said main motor, and means interlocking the control for said reversible motor with said clutch to prevent effective driving operation of one motor while the other is driving said element.

12. A machine tool combining an element to be driven, a main motor for driving said element, a transmission between said motor and said element including two serially arranged motion reversers, an auxiliary reversible motor for driving said element having power transmitting connections with said first named transmission at a point situate between said serially arranged reversers and effective to drive said element through one of said reversers, control means for said main motor and separate control means for said reversible motor interlocked with and arranged to be actuated by a repositioning of said one mechanical reverser for harmonizing direction of rotative motion therethrough by the reversible motor with the direction of rotative motion effected through both of said reversers by said main motor; and means for reversing the direction of rotation of said reversible motor and thereby the direction of movement of the said driven element independently of the position of the said one mechanical reverser.

13. A machine tool combining a member to be driven in transverse directions, a transmission including a motor and mechanical reversing means for driving the member selectively in reverse directions in one of said transverse directions; control means for said motor; another transmission for driving said member in another of said transverse directions including a second motor and a direction restoring device, said second motor being reversible and said transmission being constructed and arranged to receive power selectively from said first transmission through said mechanical reverser or from said auxiliary motor independently, control means for reversing said second motor, means interlocking said motor reversing means with said direction restoring device to directionalize rotations of the reversible motor in harmony with the setting of said direction restoring device, means for rendering but one of said transmissions effective to propel said member at any one time; and means interlocking the controls of said motors as to prohibit concurrent effective operation thereof.

14. The combination set forth in claim 13 including member actuated electrical means for stopping the movement of the member at a preset limit of shift in each of said transverse directions.

15. A machine tool combining a member to be driven in transverse directions, a transmission including a mechanical reversing means for driving the member in reverse directions selectively in one of said transverse directions, another transmission for driving said member in another of said transverse directions including a direction restoring device, said second transmission being constructed and arranged to receive power through said mechanical reverser and adapted and arranged to drive said member consistently in one direction irrespective of the direction of power flow previously determined by the setting of said reversing means, and member actuated electrical means for stopping the movement of the member at a preset limit of shift in each direction of shift in each of said transverse directions.

16. A control system for a reversible motor adapted to drive electively either one of two transmissions selectively in reverse directions and wherein one of said transmissions embodies motion reversing means in addition to the drive motor, comprising a first set of control means for controlling the direction of motor operation when one of said transmissions is to be driven, a second set of control means for controlling the direction of motor operation when the other of said transmissions is to be driven, and means operatively associated with the transmission embodying said motion reversing means and with one of said sets of motor control means for coordinating the direction of motor movements in harmony with the effective position of said motion reversing means.

17. A control system for a reversible motor adapted to drive electively either one of two transmission systems in opposite directions selectively and wherein one of said transmission systems embodies motion reversing means in addition to the said reversible motor, comprising a first set of controls for effecting actuation of said motor in a forward or a reverse direction when said motor is connected to drive one of said transmissions, a second set of controls for effecting actuation of said motor when said motor is connected to drive the other of said transmissions; and means responsive to the set condition of said additional motion reverser for naturalizing directions of motor movement consistent with said condition.

18. A control system for a reversible motor connected to drive a transmission system in opposite directions and wherein said transmission system embodies motion reversing means independent of the drive motor, comprising reversing means for the motor including a set of manually operable controls; means for actuating said motion reversing means; and means interlocking said motor reversing control means with said motion reversing means of the transmission for reversing the effective action of said motor reversing means when said motion reverser is in a position operative normally to transmit motion in one of said two directions and for conversely controlling the effective action of said motor reversing means when said motion reverser is in its other effective position.

19. A control system for a reversible motor connected to drive an element of a transmission system in opposite directions selectively and wherein said transmission system embodies separate motion reversing means adapted to be driven selectively from another source, comprising control means for the motor including a manually operable control normally operative to effect forward operation of said motor and a manually operable control normally operative to effect reverse operation of said motor; means for actuating said separate motion reversing means to an effective position; and means responsive to an actuation of said separate motion reversing means to one of its effective positions to effect motor operation in a direction consistent with the direction of motion imparted to said element by the said other source and the setting of said separate reversing means, irrespective of the direction of motor operation normally effected upon actuation of said manual controls.

20. Means for controlling the operation of two motors selectively connectible to drive a transmission comprising a first motor and a reversible second motor, and a transmission adapted to be driven thereby, motion reversing means in the transmission operative to reverse the direction of motion therethrough whenever said first motor is utilized as the driver, control means for each of said motors, means interlocking the said controls so that only one of said motors may be utilized as the driver at one time, and means interlocking the controls for said reversible motor with said reversing means of the transmission to effect motor operation and resulting transmission operation in a direction compatible with the direction of operation effected by said first motor and said reversing means.

21. Control means for prime movers selectively operable to drive one of two transmissions comprising two transmission systems, motion reversing means in one of said transmission systems, a first prime mover and means for connecting same to drive either one of said transmissions, a reversible second prime mover and means for connecting same to drive either one of said transmissions, control means for said prime movers for controlling their respective operation and the direction of operation of said reversible prime mover, means interlocking said control means as to render but one prime mover operative at any one time, and means interlocking said control means with the said reversing means in one of the transmissions to cause operation of the reversible prime mover in a direction compatible with the direction of operation of that transmission when same was driven by said first prime mover, said last mentioned interlocking means being ineffective to control the direction of operation of said reversible prime mover when the other of said two transmission systems is being driven.

22. Control means for motors adapted selectively to drive either of two transmission systems one of which transmissions is reversible comprising a first motor connectible to drive either of said transmissions, a second motor connectible to drive either of said transmissions, control means for the reversible transmission operative to transmit power in reverse directions when said transmission is driven by the said first motor, control means for said motors, and means interlocking said control means to effect operation of the reversible motor in a direction consistent with the setting of the control means for the reversible transmission.

23. A control for comprising a main reversing switch, a transmission adapted to be driven by said motor, an additional motion reverser in said transmission, a set of forward and reverse control switches for controlling the action of said main reversing switch and thereby the direction of operation of said motor, and means connected with said additional reverser to reverse the effective action of said forward and reverse switches on the said main reversing switch in correspondence with the position of said additional reverser, said means being effective to cause motor operation in directions corresponding to said forward and reverse switches and in directions directly opposite respectively.

24. A control for a reversible motor connected to drive a member selectively in opposite directions comprising a transmission connecting said motor with the member to be driven, a reversing controller for said motor, a motor forward switch and circuit adapted when actuated to operate the controller and normally to effect motor operation forward, a motor reverse switch and circuit adapted when actuated to operate the controller and normally to effect reverse operation of the motor, additional reversing means in the transmission connecting said motor with the member to be driven, and means operative when said additional reversing means is in one of its effective positions to render the said forward and reverse switches effective to cause motor operation in corresponding directions and when said additional reversing means is in its other effective position to render the said forward and reverse switches effective to cause motor operation in directions directly opposite respectively.

25. A first power transmission combining two mechanical reversers in series, a driven second transmission connectible to the said first transmission intermediate said reversers and when connected directionally responsibe to but one of said two reversers, a main motor for driving said transmissions, the one in a direction determined by the setting of both of said reversers and the other in a direction determined by the setting of the first reverser in the series, a reversible motor connected to said first transmission between said two reversers and adapted selectively to drive said first and second transmissions in opposite directions electively, control means for said motors including means rendering one of said motors ineffective when the other is operative, control means for said reversers, and means interlocking said control means to effect normal reversing operations of said reversible motor when said second transmission is being driven thereby and reversing operations of said motor consistent with the setting of said second reverser in the series when said first transmission is being driven thereby.

GRANGER DAVENPORT.